US012801874B2

(12) United States Patent
Savarese

(10) Patent No.: US 12,801,874 B2
(45) Date of Patent: Nov. 17, 2026

(54) RADIO FREQUENCY IDENTIFICATION SCANNING SYSTEM HAVING GIMBAL

(71) Applicant: Genuine Inc., San Ramon, CA (US)

(72) Inventor: Chris Savarese, Danville, CA (US)

(73) Assignee: Genuine Inc., San Ramon, CA (US)

( * ) Notice: Subject to any disclaimer, the term of this patent is extended or adjusted under 35 U.S.C. 154(b) by 0 days.

(21) Appl. No.: 18/780,471

(22) Filed: Jul. 22, 2024

(65) Prior Publication Data

US 2025/0036896 A1 Jan. 30, 2025

Related U.S. Application Data

(60) Provisional application No. 63/528,617, filed on Jul. 24, 2023.

(51) Int. Cl.

*G06K 7/10* (2006.01)
*F16M 11/12* (2006.01)

(52) U.S. Cl.

CPC ....... *G06K 7/10386* (2013.01); *F16M 11/123* (2013.01)

(58) Field of Classification Search

CPC ............. G06K 7/10386; F16M 11/123; F16M 11/2014; F16M 2200/041; F16M 11/041; F16M 11/105; F16M 11/18; F16M 13/04

See application file for complete search history.

(56) References Cited

U.S. PATENT DOCUMENTS

2013/0201470 A1* 8/2013 Cramer .................. G01C 15/06 356/72
2017/0185954 A1* 6/2017 McAllister ........... H01Q 1/2216
2024/0354393 A1 10/2024 Savarese

* cited by examiner

*Primary Examiner* — Matthew Mikels
(74) *Attorney, Agent, or Firm* — WOMBLE BOND DICKINSON (US) LLP

(57) ABSTRACT

A radiofrequency identification (RFID) scanning system and method includes a RFID reader, a camera mount or camera, and a gimbal. The gimbal connects the RFID reader to the camera mount or camera to stabilize the camera mount or camera irrespective of movement of the RFID reader about one or more axes. Other embodiments are described and claimed.

20 Claims, 5 Drawing Sheets

RADIO FREQUENCY IDENTIFICATION SCANNING SYSTEM HAVING GIMBAL

This application claims the benefit of priority of U.S. Provisional Patent Application No. 63/528,617, filed on Jul. 24, 2023, titled “RADIO FREQUENCY IDENTIFICATION SCANNING SYSTEM HAVING GIMBAL,” which is incorporated herein by reference in its entirety to provide continuity of disclosure.

FIELD OF THE INVENTION

The invention relates to radio frequency identification (RFID) readers, and more particularly to RFID readers capable of being used for event-based authentication.

BACKGROUND OF THE INVENTION

Fraud is a significant problem in the world of physical collectibles. The industry relies on unsophisticated solutions—including paper certificates of authenticity, database structures that provide inaccurate authenticity information, holograms stickers that can be forged, and the imperfect and unreliable practice of “photo matching.” For example, in sports, Major League Baseball (MLB) is viewed as a gold standard in authentication. MLB’s program is decades old, is labor-intensive, and uses a database that can provide inaccurate information. For example, the database may misinform a consumer regarding whether they are in possession of an authentic collectible or one that has been forged.

SUMMARY OF THE DESCRIPTION

A radio frequency identification (RFID) scanning system is provided. The RFID scanning system includes a RFID reader, a camera mount, and a gimbal. The gimbal connects the RFID reader to the camera mount to stabilize the camera mount irrespective of movement of the RFID reader about one or more axes.

A RFID scanning system is provided. The RFID scanning system includes a RFID reader, a camera, and a gimbal. The gimbal connects the RFID reader to the camera to stabilize the camera irrespective of movement of the RFID reader about one or more axes.

A method is provided. The method includes capturing, by a camera of a RFID scanning system, an image of an object having a RFID tag. The method includes moving an RFID reader of the RFID scanning system about one or more axes to scan the RFID tag. The method includes generating, by an output device of the RFID scanning system in response to the RFID reader scanning the RFID tag, an alert.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
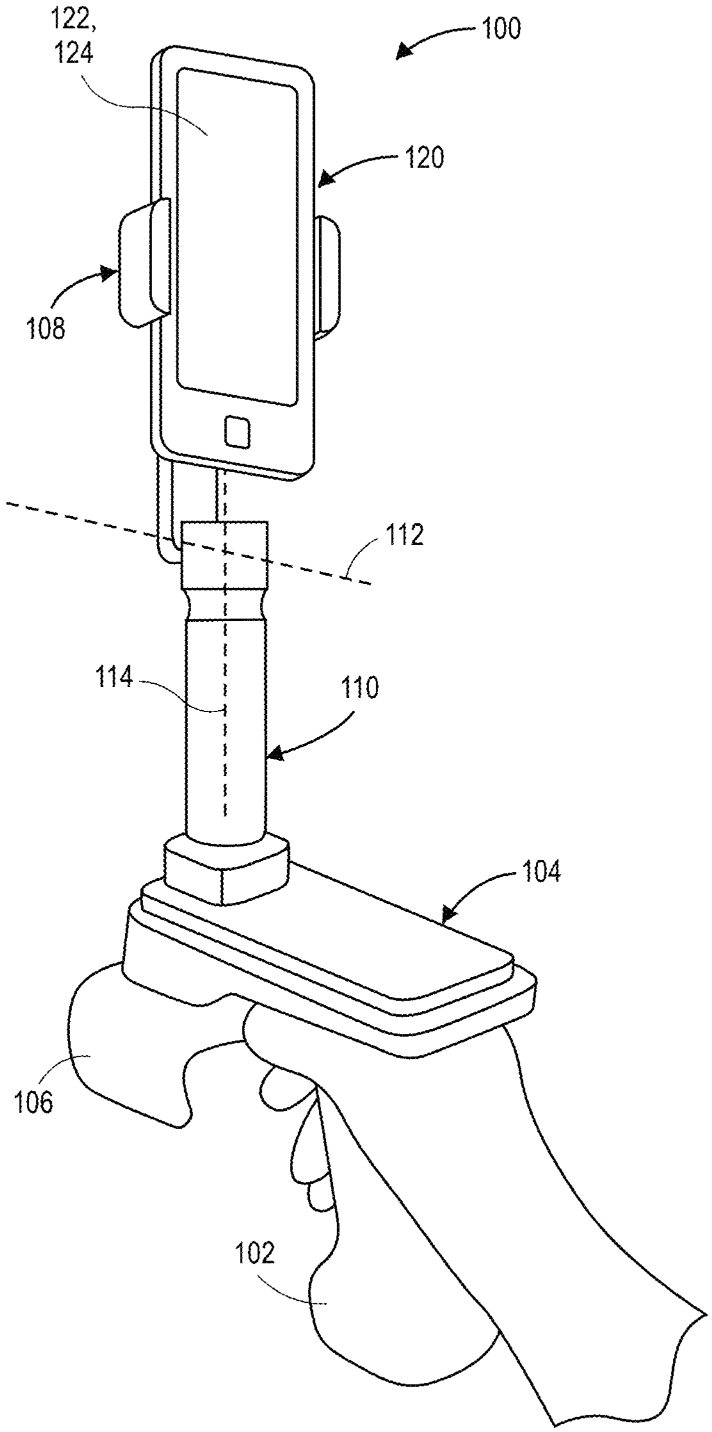
FIG. 1 illustrates a rear perspective view of a radio frequency identification (RFID) scanning system having a handle in a first rotational orientation, in accordance with an embodiment.

Various embodiments and aspects will be described with reference to details set below, and the accompanying drawings will illustrate the embodiments. The following description and drawings are illustrative and are not to be construed as limiting the invention. Numerous specific details are described to provide a thorough understanding of various embodiments. However, in certain instances, well-known or conventional details are not described in order to not unnecessarily obscure the present invention in detail.

Existing methods of authenticating physical collectibles used at events, such as sporting events or concerts, typically do not allow for real-time association of the physical collectible with event-based data. Such association can provide enhanced authentication. The association may occur through simultaneously imaging the physical collectible at the event while scanning or interrogating a tag on the physical collectible. The tag can store information uniquely identifying the physical collectible. Accordingly, the captured image and scanned information can be associated with each other, e.g., in a digital asset, to authenticate the presence of the physical collectible at the event. Techniques for making such as association to provide event-based authentication of physical collectibles is described in U.S. patent application Ser. No. 18/634,791, titled “System And Method Of Generating Authentication Asset Using Radio Frequency Identification and Event Date” and filed on Apr. 12, 2024, the contents of which are incorporated herein by reference in their entirety.

The development of authentication techniques as described above may require radio frequency identification (RFID) scanning systems that can both capture video of an event zone, e.g., a playing field or a stage, as well as physical collectibles within the event zone, e.g., a sports jersey or a guitar, while simultaneously interrogating the event zone to capture RFID data from RFID tags mounted on the physical collectibles. Traditionally, RFID scanning systems can be used to detect tags, such as barcode tags on an object at a point-of-sale. Such near-field interrogation systems, however, are not equipped to scan RFID tags on objects at a distance, and do not capture images of the objects while scanning. Accordingly, there is a need for a RFID scanning system that can capture image and RFID data for use in event-based authentication.

In an aspect, a RFID scanning system can capture images of objects being used at an event while scanning RFID tags mounted on the objects. The time-related data capture of the images and the RFID information can be used to authenticate the object as being present at the event, e.g., to authenticate the object as a physical collectible. The RFID scanning system can allow for single-handed operation. For example, a user can hold the RFID scanning system with one hand to record video of the event while scanning the event. Such single-handed operation can require the user to move an RFID reader of the RFID scanning system, e.g., tilt or rotate the scanner relative to the ground, to align a scanning beam of the RFID reader with a RFID tag for optimal reading range. A camera of the RFID scanning system may remain stable relative to the ground during such movement. For example, the RFID scanning system can include a gimbal connecting the RFID reader to the camera to stabilize the camera while the reader is moved freely. Accordingly, the RFID scanning system can provide a long-range RFID reader with video capability to capture data for use in authenticating physical collectibles.

Referring to FIG. 1, a rear perspective view of a radio frequency identification (RFID) scanning system having a handle in a first rotational orientation is shown in accordance with an embodiment. A RFID scanning system 100 can be a handheld device or system used to scan a RFID tag. For example, the RFID tag may be mounted on or embedded in an object, such as a sports jersey being worn by a player during a game, and the RFID scanning system 100 can query the RFID tag at a distance to authenticate the use of the sports jersey during the game.

The RFID scanning system 100 can include a RFID reader 104. The RFID reader 104 may include a handle 102 to allow a user to hold and manipulate the RFID reader 104 in space. More particularly, the user can grip the handle 102 and can move the handle 102 to cause the RFID reader 104 to move and point toward the object. The RFID reader 104 can include a RFID antenna 106 to generate and emit a scanning beam, as described below. Accordingly, the handle 102 can be maneuvered by the user to direct the scanning beam toward the object to scan the RFID tag.

In an embodiment, the RFID scanning system 100 includes a camera mount 108 connected to the RFID reader 104. For example, a gimbal 110 of the RFID scanning system 100 can interconnect the camera mount 108 to the RFID reader 104. The gimbal 110 can connect the handle 102 and RFID reader 104 to the camera mount 108 such that motion of the camera mount 108 is independent of rotation of the handle 102. More particularly, the gimbal 110 can stabilize the camera mount 108 irrespective of movement of the RFID reader 104 about one or more axes.

In an embodiment, the one or more axes about which the RFID reader 104 may move (or be moved) can include a first axis 112, e.g., a horizontal axis extending in a forward direction from the gimbal 110, and a second axis 114, e.g., a vertical axis extending orthogonal to the first axis 112. The user may move (roll) the RFID reader 104 about the first axis 112 (e.g., a roll axis) by sweeping the handle 102 in an arc within a vertical plane, e.g., from left to right within the vertical plane. Similarly, the user may move (yaw) the RFID reader 104 about the second axis 114 (e.g., a yaw axis) by twisting the handle 102 in an arc within a horizontal plane, e.g., from left to right within the horizontal plane. The user may therefore move the RFID scanning system 100 to a second rotational orientation in which the handle 102 is oriented differently than the first rotational orientation. For example, in the second rotation orient of FIG. 5, the handle 102 can be orientated such that the scanning plane is substantially oblique to the horizon, e.g., near a 45 degree angle to and approaching vertical. By contrast, the camera mount 108 can remain stable.

The camera mount 108 can be stable by not moving relative to an initial orientation. Whereas the RFID reader 104 can move from the first rotational orientation to the second rotational orientation, the camera mount 108 can retain the initial orientation in both states. More particularly, the camera mount 108 can have a same orientation both when the camera mount 108 has the first rotational orientation and when the camera mount 108 has the second rotational orientation.

To stabilize the camera mount 108 in spite of movement of the RFID reader 104, the movement of the RFID reader 104 may be counteracted by motors of the gimbal 110. For example, a first motor of the gimbal 110 can move the camera mount 108 in an opposite direction to the movement of the RFID reader 104 about the first axis 112 to stabilize the camera mount 108 about the roll axis. Similarly, a second motor of the gimbal 110 can move the camera mount 108 in an opposite direction to the movement of the RFID reader 104 about the second axis 114 to stabilize the camera mount 108 about the yaw axis. In such case, the gimbal 110 can include a two-axis gimbal. It will be appreciated, however, that additional gimbal types, such as a one-axis gimbal or a three-axis gimbal may be used to stabilize the camera mount 108.

Still referring to FIG. 1, the RFID scanning system 100 can include a camera (not shown) mounted on the camera mount 108. For example, a mobile device 120 can include the camera to capture one or more images, e.g., video, of an event. The mobile device 120 may be smartphone or a tablet computer, for example. The one or more images can be displayed on an output device 122 of the mobile device 120, such as a display 124. Accordingly, the user can point the RFID reader 104 toward the event to interrogate RFID tags on objects being used during the event, such as sports jerseys, guitars, baseball bats, etc., while simultaneously viewing video of the event and objects being captured by the camera, e.g., of the mobile device 120. As described below, the user can move the RFID reader 104 to maximize a scanning range and interrogate RFID tags at far distances across the event, and the gimbal 110 can stabilize the camera to capture stable imagery. Notably, the tag scanning and stable video capture can be achieved through single-handed operation of the RFID scanning system 100.

Figure 2:
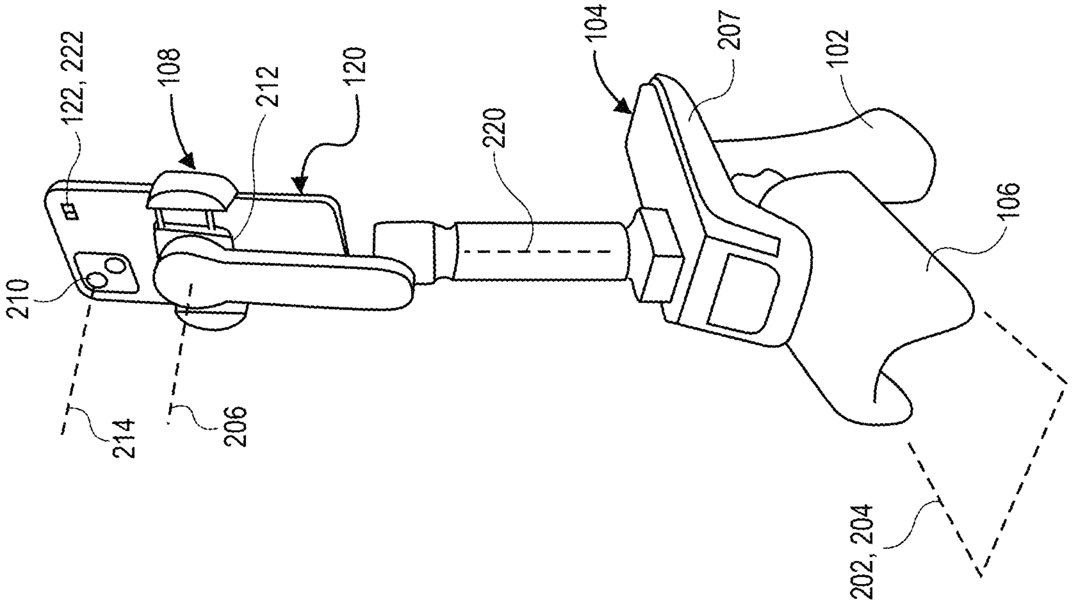
FIG. 2 illustrates a front perspective view of a RFID scanning system having a mobile device mounted in a device mount, in accordance with an embodiment.

Referring to FIG. 2, a front perspective view of a RFID scanning system having a mobile device mounted in a device mount is shown in accordance with an embodiment. In a first rotational orientation, a scanning beam 202 of the RFID reader 104 can have a scanning plane 204 that has a relative orientation to a stability axis 206 of the camera mount 108. For example, both the scanning plane 204 and the stability axis 206 may be substantially parallel to a horizon or the ground, e.g., horizontal. The stability axis 206 can be a reference axis against which movement (or lack thereof) of the camera mount or camera may be compared. More particularly, the camera mount or camera may not move relative to the stability axis 206, either along or about the axis, when the RFID reader 104 moves rotates about one or more axes.

The RFID reader 104 can include the handle 102, a housing 207, and RFID scanning circuitry contained by the housing 207. The handle 102 can be grasped by the user. The handle 102 can protrude from the housing 207 such that the user can hold the grip to control an orientation of the housing 207. RFID scanning circuitry, e.g., the RFID antenna 106, can be stored in the housing 207. The RFID reader 104 can be a scanner of any of several RFID reader types, including a passive reader or an active reader. For example, the RFID reader 104 can be an active RFID reader 104 having the antenna operating in the UHF band to provide long-range reading capability, e.g., in a range of up to about 300 feet.

The RFID reader 104 can emit a reader signal having a dominant scanning plane 204. More particularly, the RFID reader 104 may be a linearly-polarized RFID reader 104. Accordingly, the RFID reader 104 can include a linear polarized RFID antenna 106 to emit the scanning beam 202 in the single scanning plane 204. Such linear polarization can be contrasted with circularly polarized scanning beams 202, which may not require movement to align with an RFID tag, but which have shorter scanning ranges compared to linearly polarized scanning beams 202. More particularly, linearly-polarized RFID systems have greater range than circularly-polarized systems. To maximize read range, however, the user may have to rotate the RFID reader 104, and more particularly the scanning plane 204 of the RFID reader 104, to obtain optimal alignment with an RFID tag in an interrogation zone. For example, the RFID tag may be stitched into a jersey of a player on a sports field being interrogated.

The camera mount 108 can hold a camera 210 or a camera lens. The camera mount 108 may include a structure, such as a gripper 212, that an external camera 210 may be loaded into. The camera mount 108 may include a quick-connect structure to allow the mobile phone to be quickly mounted on the system. The gripper 212 can include opposing, movable structures, such as jaws, that can clamp the mobile device 120 to hold the mobile device. Alternatively, the gripper 212 may include a magnet to attach to a case of the mobile device 120. The camera mount 108 can direct the camera 210 of the mobile device 120 toward an event to be video recorded. For example, the mobile device 120 may be held such that an optical axis 214 of the camera 210 is directed forward, e.g., parallel to the scanning plane 204. Similarly, the optical axis 214 may remain fixed and/or parallel relative to the stability axis 206. Such relative orientation can remain stable irrespective of movement of the RFID reader 104. That is, when the RFID reader 104 moves in space, the camera mount 108 or camera 210 can remain fixed in space, and the stability axis 206 and optical axis 214 may not move.

The camera mounted on (or integrated within) the camera mount 108 can be used to capture video of an event. For example, the captured video may be of the player on the sports field wearing the sports jersey having the RFID tag. The RFID reader 104 or the mobile device 120 mounted on the camera mount 108 can include one or more of processing devices or sensors to generate real-time data associated with the event. For example, the RFID reader 104 or the camera 210 associated with the RFID reader 104 can include one or more processing devices or sensors to generate location data (e.g., a GPS sensor), time data (e.g., a clock), or other event-based data that can be associated with the RFID tag and/or jersey.

Data generated by the RFID reader 104 can be associated with video captured by the camera 210. For example, the event-based data, such as date, time, location, etc., of the event can be superimposed on and/or associated as metadata with frames of the captured video. The RFID reader 104 can generate or read unique codes associated with the RFID tag to associate with the captured video. Accordingly, such data may be displayed as a text element in an alert, as described below.

The gimbal 110 can keep the camera mount 108 (and/or a camera or a camera lens held by the camera mount) steady while the handle 102 moves. More particularly, the gimbal 110 can be a pivoted support that allows the camera mount 108 to remain independent of rotation of the handle 102. As described above, the gimbal 110 can be a single-axis, a two-axis, or a three-axis gimbal, which allows the camera mount 108 (and/or a camera 210 held by the camera mount 108) to remain stable when the RFID reader 104 is rotated freely in one or more directions. The gimbal 110 may include motors and/or sensors. Sensors in the gimbal 110 can detect movement of the camera 210, and motors of the gimbal 110 can counteract movement, by adjusting links and joints of the gimbal structure, keeping the camera still. Other mechanisms, such as gyros, may be incorporated in the gimbal 110 to maintain independent motion between the camera mount 108 and the handle 102.

Stabilization provided by the gimbal 110 can maintain the optical axis 214 parallel to the scanning plane 204 and/or the stability axis 206. An RFID tag being interrogated by the RFID reader 104 can be on an object being imaged by the camera 210 and, thus, the optical axis 214 and the scanning beam 202 may ideally project in a common direction. Maintaining the optical axis 214 and the scanning beam 202 in a parallel relative orientation can ensure that the scanning beam 202 projects toward the object that is being imaged. Accordingly, in an embodiment, the gimbal 110 can include a two-axis gimbal 110 that allows the scanning plane 204 to roll and yaw relative to the optical axis 214, but does not allow the scanning plane 204 to pitch relative to the optical axis 214.

The scanning beam 202 may perform optimally when no metal is within a predetermined distance of the RFID antenna 106. More particularly, allowing metal objects near the RFID antenna 106 can create interference that limits a reading range of the RFID reader 104. To avoid such interference, the camera mount 108 (and thus, the mobile device 120) may be offset above or below the scanning plane 204, and separated from the RFID reader 104 by the predetermined distance. More particularly, one or more links of the gimbal 110 can extend from the RFID reader 104 to the camera mount 108 along a gimbal axis 220 to offset the camera mount 108 from the scanning plane 204. The offset can position the camera mount 108 and the camera 210 at a location that is spaced apart from the scanning plane 204 along an axis orthogonal to the scanning plane 204. Such spacing can create a buffer zone having no metal objects around the RFID reader 104. In any case, there may be no metallic portion of the RFID scanning system 100 in front of (within the scanning plane 204) of the RFID antenna 106. The buffer zone and clear line of sight of the scanning plane 204 can optimize the reading range and performance.

As described above, the mobile device 120 can include one or more output devices 122. For example, the output device 122 can include the display 124 to provide a visual output, such as an image element. Alternatively, the output device 122 may include a speaker 222 to provide an audible output, such as a sound.

Figure 3:
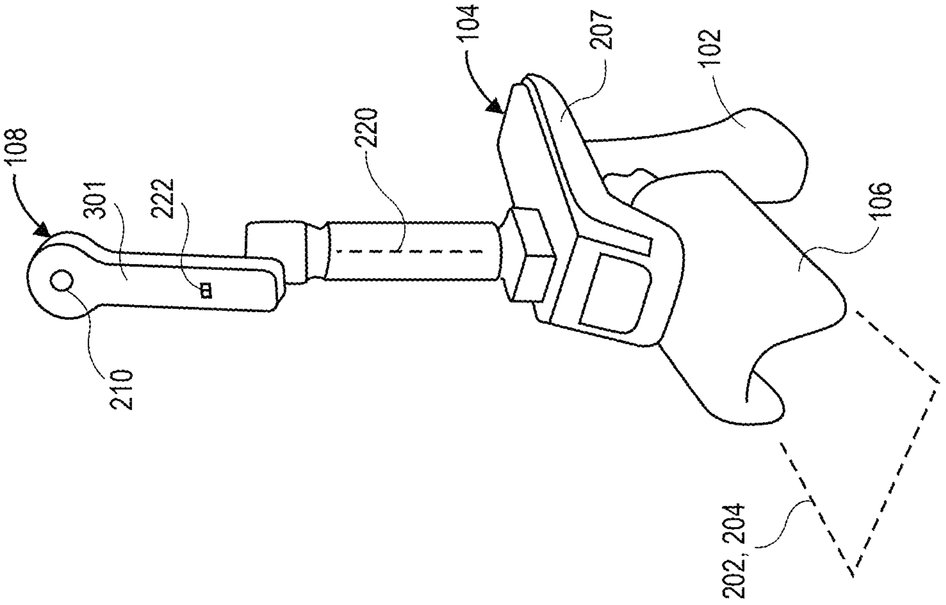
FIG. 3 illustrates a front perspective view of a RFID scanning system having an integrated camera, in accordance with an embodiment.

Referring to FIG. 3, a front perspective view of a RFID scanning system having an integrated camera is shown in accordance with an embodiment. In an embodiment, the camera mount 108 includes a housing 301 containing the camera 210. More particularly, the RFID scanning system 100 may include the camera 210, and the camera can be integrated into the camera mount 108. Accordingly, as described above for the system having a separate camera 210, the gimbal 110 can connect the RFID reader 104 to the camera 210 to stabilize the camera irrespective of movement of the RFID reader 104 about one or more axis.

The RFID scanning system 100 having the integrated camera 210 can include structure similar to that described above. For example, the gimbal 110 can extend from the RFID reader 104 along the gimbal axis 220 to offset the camera 210 from the scanning plane 204. Accordingly, it will be appreciated that structural and functional descriptions related to the system illustrated in FIG. 2 may similarly describe the system illustrated in FIG. 3.

Figure 4:
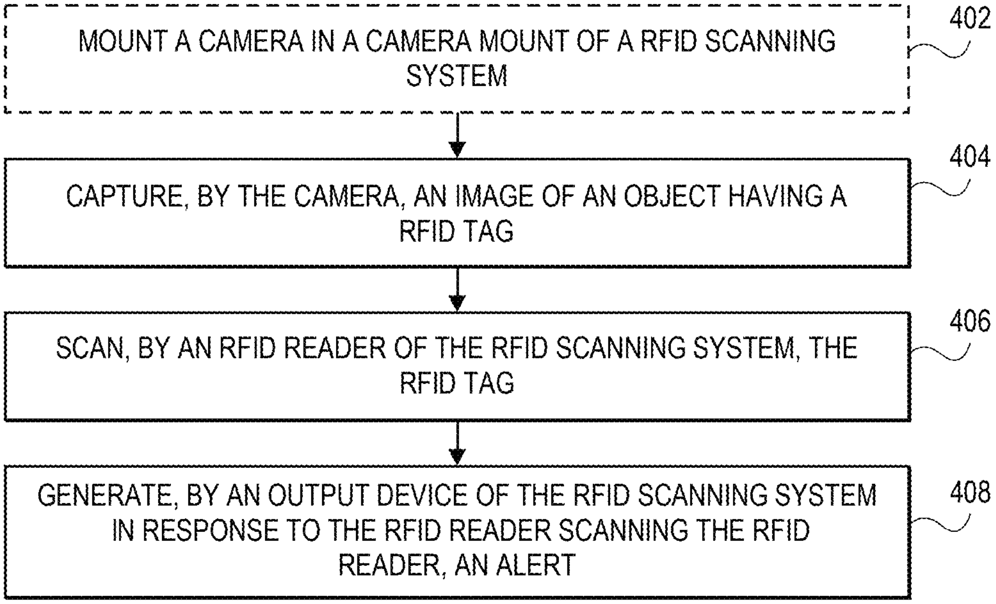
FIG. 4 illustrates a flowchart of a method of scanning a RFID tag with a RFID scanning system, in accordance with an embodiment.

Referring to FIG. 4, a flowchart of a method of scanning a RFID tag with a RFID scanning system is shown in accordance with an embodiment. The method may be performed by any of the RFID scanning systems 100 described herein, e.g., the RFID scanning system 100 having a separate camera 210 (FIG. 2) or integrated camera 210 (FIG. 3). Operations of the method are illustrated with respect to the figures and, thus, the figures are referred to in combination below.

Referring again to FIG. 1, optionally, at operation 402, the camera 210 is mounted in the camera mount 108 of the RFID scanning system 100. The camera 210 may be mounted by clamping the mobile device 120 in the camera mount 108, for example. Mounting the camera 210 can include positioning the mobile device 120 such that the optical axis 214 is parallel to the scanning plane 204.

Figure 5:
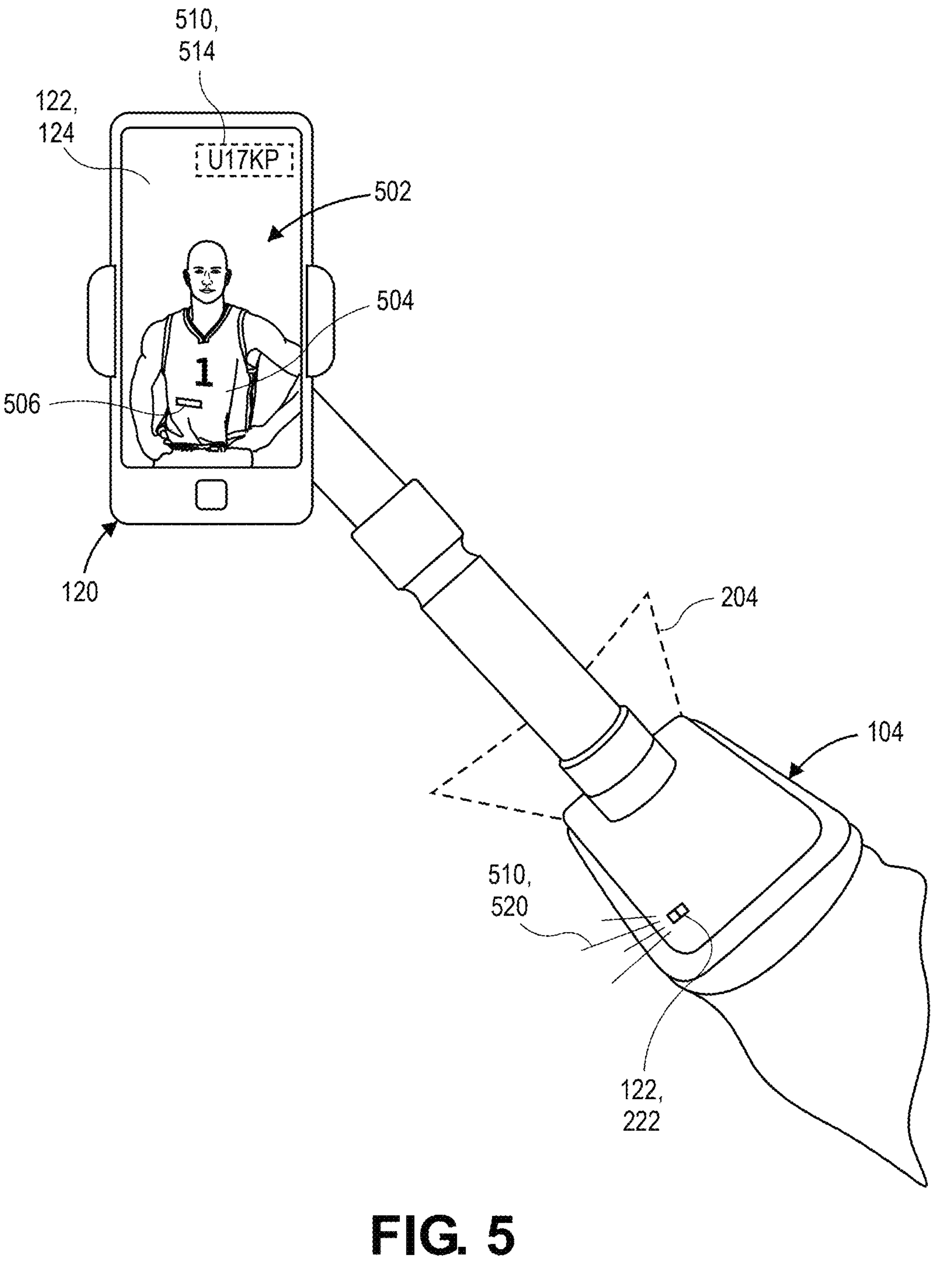
FIG. 5 illustrates a rear perspective view of a RFID scanning system having a handle in a second rotational orientation, in accordance with an embodiment.

Referring to FIG. 5, a rear perspective view of a RFID scanning system having a handle in a second rotational orientation is shown in accordance with an embodiment. At operation 404, the camera 210 of the RFID scanning system 100 captures an image 502 of an object 504 having a RFID tag 506. The image 502 may be the same or similar in the first rotational orientation of FIG. 1 and the second rotation orientation of FIG. 4. More particularly, the camera 210 may be stabilized (not move relative to the stability axis 206 or relative to the scene being imaged) to provide a stable image 502 of the object 504.

The RFID tag 506 may be mounted on or embedded within the object 504. For example, the RFID tag 506 may be an active RFID tag or a passive RFID tag having memory storing a unique identification code (UID 516). The memory may be coupled to an integrated circuit, which may use energy absorbed from the scanning beam 202 to reflect a return signal encoding the UID 516 or additional information stored in the memory.

At operation 406, the RFID reader 104 can scan the RFID tag 506. The user may move the RFID reader 104 of the RFID scanning system 100 about one or more axes when scanning the RFID tag 506. For example, the user may move the RFID reader 104 relative to the mobile device 120 and/or camera 210 to reach the second rotational orientation. In the second rotational orientation, the scanning beam 202 can be optimally aligned with the RFID tag 506. To move from the first rotational orientation to the second rotational orientation, the user may rotate the RFID reader 104 about a roll axis extending within the scanning plane 204. As the RFID reader 104 is moved, the gimbal 110 can react to and counteract the movement of the mobile device 120 and may therefore stabilize the mobile device 120 relative to the ground. More particularly, the camera 210 can remain stable when the RFID reader 104 moves about the one or more axes. Accordingly, the image 502 captured by the camera 210 can be stabilized. Notably, the optical axis 214 (extending into the page) can be parallel to the scanning image 502 (directed to the object 504 behind the mobile device 120 in the perspective view) in both the first rotational orientation and the second rotational orientation.

In an embodiment, the RFID tag 506 is a passive RFID tag. Although such tags are not typically interrogated at far distances by circularly polarized scanning the beams, the linearly polarized scanning beam 202 can allow the RFID reader 104 to be moved to an orientation to scan the passive RFID at a far distance. For example, the RFID reader 104 can scan the passive RFID tag 506 at a distance greater than 50 feet.

Movement of the RFID reader 104 may be accompanied by adjustments of the gimbal 110. For example, as the user moves the RFID reader 104, a processing device of the RFID scanning system 100 can detect the movement, e.g., based on one or more sensors contained in the housing 207 of the RFID reader 104, and the processing device can control adjustment of the gimbal 110 to counteract the RFID reader movement. More particularly, the processing device can drive motion of one or more actuators or motors in the gimbal 110 to cause links of the gimbal 110 to move relative to each other and thereby adjust the position of, and stabilize, the camera 210 or camera mount 108.

At operation 408, the output device 122 of the RFID scanning system 100 can generate an alert 510 in response to the RFID reader 104 scanning the RFID tag 506. As described above, the user moves the RFID reader 104 to align the scanning beam 202 with the RFID tag 506 and query the tag while recording image(s) 502. Without some form of feedback, the user may be unaware whether the tag is or is not successfully interrogated (scanned). Accordingly, the alert 510 can provide feedback to notify the user when the RFID reader 104 receives a return signal from the RFID tag 506, e.g., a signal encoding information stored in a memory of the RFID tag 506. Such information may include, for example, the UID 516 associated with the RFID tag 506 (and thus, associated with the object 504 on which the RFID tag 506 is mounted.

The alert 510 may include one or more of a visual alert or an audible alert that the RFID tag 506 was scanned. The alert 510 may be provided by one or more output device 122 of the mobile device 120 or RFID scanning system 100. For example, the alert 510 can be a visual alert generated by the display 124 of the mobile device 120. The display 124 may display an image element 514 to indicate that the RFID tag 506 was successfully scanned. For example, the image element 514 may be a text element containing the UID 516 associated with the RFID tag 506. The text element may include an alphanumeric label overlaid on the captured image(s) 502 of the event. Accordingly, the user can view the alert 510 while recording video of the event and manipulating the handle 102 to capture a return signal from the RFID tag 506 to determine that RFID reader 104 has been properly oriented.

The image element 514 may include additional information overlaid on the captured image(s) 502. For example, the RFID scanning system 100 may determine a time or location that the RFID tag 506 was scanned by the RFID reader 104, e.g., the time or a GPS location when the return signal is received, and the time or location may be displayed as part of the image element 514. The displayed time can include a timestamp, for example. The displayed location may include a venue name. Additional information, such as a description of the object 504 or a name of a participant using the object 504 in the event may also be displayed as part of the alert 510.

The alert 510 may include an audible alert 510. The audible alert 510 may, for example, be generated by a speaker 222 of the mobile device 120 or the RFID scanning system 100. The audible alert 510 can include playing a sound 520 by the speaker 222. Accordingly, the user can hear the alert 510 while recording video of the event and manipulating the handle 102 to capture a return signal from the RFID tag 506 to determine that RFID reader 104 has been properly oriented.

It will be appreciated that the above method may be performed using a RFID scanning system 100 having decoupled RFID reader and camera components. More particularly, a user may hold a RFID reader in one hand and a camera in another hand. Alternatively, the RFID reader and the camera may be mounted at a distance from each other, e.g., on respective tripods, and independently directed toward the event. Such independently located components may nonetheless be used to simultaneously record image(s) 502 of an event and interrogate RFID tags 506 on an object 504 at the event. The system may provide an alert 510 to the user to confirm that the RFID tag 506 is successfully scanned for use in future authentication of the object 504 as a physical collectible associated with the event.

Figure 6:
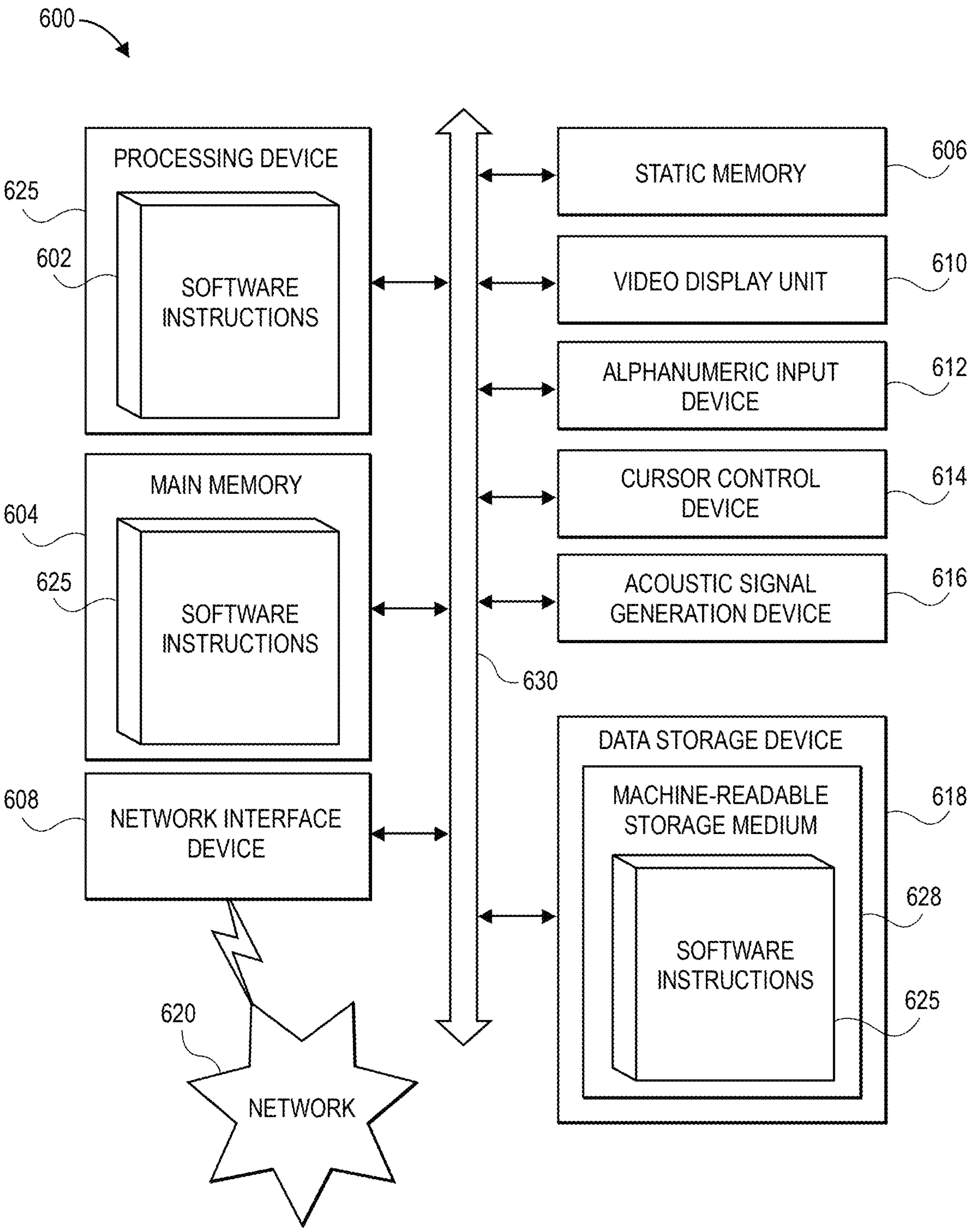
FIG. 6 illustrates a block diagram of an example computing device that may perform one or more of the operations described herein, in accordance with an embodiment.

Referring to FIG. 6, a block diagram of an example computing device that may perform one or more of the operations described herein is shown in accordance with an embodiment. Computing device 600 may be incorporated in one or more components of the RFID scanning system 100, e.g., within the RFID reader 104, the mobile device 120, etc. The computing device 600 may be connected to other computing devices in a LAN, an intranet, an extranet, and/or the Internet. The computing device may operate in the capacity of a server machine in client-server network environment or in the capacity of a client in a peer-to-peer network environment. Further, while only a single computing device is illustrated, the term "computing device" shall also be taken to include any collection of computing devices that individually or jointly execute a set (or multiple sets) of instructions to perform the methods discussed herein. For example, the components of the computing device 600 may be distributed or replicated amongst the components of the RFID scanning system 100.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein. For example, the software instructions 625 may include instructions for controlling adjustments of the gimbal 110 in response to movements of the RFID reader 104.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., the speaker 222). In one embodiment, video display unit 610, alphanumeric input device 612, and cursor control device 614 may be combined into a single component or device (e.g., an LCD touch screen, such as display 124).

Data storage device 618 may include a computer-readable storage medium 628 on which may be stored one or more sets of instructions that may include software instructions 625 for carrying out the operations described herein, in accordance with one or more aspects of the present disclosure. The instructions may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency identification (RFID) scanning system, comprising:
- a RFID reader;
- a camera mount; and
- a gimbal connecting the RFID reader to the camera mount to stabilize the camera mount and maintain a relative orientation of a stability axis of the camera mount to a scanning plane of the RFID reader irrespective of movement of the RFID reader about one or more axes.

2. The RFID scanning system of claim 1, wherein the RFID reader includes a linear polarized RFID antenna to emit a scanning beam in the scanning plane.

3. The RFID scanning system of claim 2, wherein the gimbal extends from the RFID reader along a gimbal axis to offset the camera mount from the scanning plane.

4. The RFID scanning system of claim 1, wherein the gimbal includes a two-axis gimbal.

5. The RFID scanning system of claim 1, wherein the RFID scanning system further includes a camera mounted on the camera mount.

6. The RFID scanning system of claim 5, wherein the camera mount includes a gripper to hold a mobile device having the camera.

7. A radio frequency identification (RFID) scanning system, comprising:
- a RFID reader;
- a camera; and
- a gimbal connecting the RFID reader to the camera to stabilize the camera and maintain a relative orientation of an optical axis of the camera to a scanning plane of the RFID reader irrespective of movement of the RFID reader about one or more axes.

8. The RFID scanning system of claim 7, wherein the RFID reader includes a linear polarized RFID antenna to emit a scanning beam in the scanning plane.

9. The RFID scanning system of claim 8, wherein the gimbal extends from the RFID reader along a gimbal axis to offset the camera from the scanning plane.

10. The RFID scanning system of claim 8, wherein the gimbal maintains the optical axis of the camera parallel to the scanning plane when the RFID reader moves from a first rotational orientation to a second rotational orientation.

11. A method, comprising:

capturing, by a camera of a radio frequency identification (RFID) scanning system, an image of an object having a RFID tag;

scanning, by an RFID reader of the RFID scanning system, than RFID tag when the RFID reader is moved about one or more axes, wherein the RFID scanning system includes a gimbal connecting the RFID reader to the camera to stabilize the camera and maintain a relative orientation of an optical axis of the camera to a scanning plane of the RFID reader when the RFID reader moves about the one or more axes; and generating, by an output device of the RFID scanning system in response to the RFID reader scanning the RFID tag, an alert.

12. The method of claim 11, wherein the alert includes one or more of a visual alert or an audible alert that the RFID tag was scanned.

13. The method of claim 12, wherein the output device is a display, and wherein generating the visual alert includes displaying an image element by the display.

14. The method of claim 13, wherein the image element includes one or more of a unique identification code stored by a memory of the RFID tag or a time when the RFID tag was scanned by the RFID reader.

15. The method of claim 12, wherein the output device is a speaker, and wherein generating the audible alert includes playing a sound by the speaker.

16. The method of claim 11, wherein the RFID tag includes a passive RFID tag having a memory storing a unique identification code, and wherein the RFID reader is moved to scan the passive RFID tag at a distance greater than 50 feet.

17. The method of claim 11 further comprising mounting the camera in a camera mount of the RFID scanning system, wherein the RFID scanning system includes the gimbal connecting the RFID reader to the camera mount.

18. The method of claim 17, wherein the RFID reader includes a linear polarized RFID antenna to emit a scanning beam in the scanning plane.

19. The method of claim 18, wherein the gimbal extends from the RFID reader along a gimbal axis to offset the camera from the scanning plane.

20. The method of claim 18, wherein the gimbal maintains the optical axis of the camera parallel to the scanning plane when the RFID reader moves from a first rotational orientation to a second rotational orientation.

* * * * *